(12) United States Patent
Calton et al.

(10) Patent No.: US 11,693,715 B2
(45) Date of Patent: Jul. 4, 2023

(54) METHOD AND APPARATUS FOR REAL-TIME DYNAMIC APPLICATION PROGRAMMING INTERFACE (API) TRAFFIC SHAPING AND INFRASTRUCTURE RESOURCE PROTECTION IN A MULTICLIENT NETWORK ENVIRONMENT

(71) Applicant: Pitney Bowes Inc., Shelton, CT (US)

(72) Inventors: Jody Calton, Orlando, FL (US); Benny Tseng, Brookfield, CT (US); Michael Russell, Torrington, CT (US); Sai Kumar Pola, Farmers Branch, TX (US); Xaysana Saycocie, Westminster, CO (US)

(73) Assignee: Pitney Bowes Inc., Shelton, CT (US)

( * ) Notice: Subject to any disclaimer, the term of this patent is extended or adjusted under 35 U.S.C. 154(b) by 183 days.

(21) Appl. No.: 17/399,181

(22) Filed: Aug. 11, 2021

(65) Prior Publication Data
US 2023/0045994 A1     Feb. 16, 2023

(51) Int. Cl.
*G06F 9/54*     (2006.01)
*G06F 16/245*     (2019.01)
*G06Q 10/083*     (2023.01)

(52) U.S. Cl.
CPC ............ *G06F 9/541* (2013.01); *G06F 16/245* (2019.01); *G06Q 10/083* (2013.01)

(58) Field of Classification Search
CPC ..... G06F 9/541; G06F 16/245; G06Q 10/083; H04L 47/125; H04L 47/22; H04L 41/5003; H04L 41/5009; H04L 41/5022; H04L 67/60; H04L 47/6295; H04L 67/61
See application file for complete search history.

(56) References Cited

U.S. PATENT DOCUMENTS

| | | | |
|---|---|---|---|
| 2019/0068622 A1* | 2/2019 | Lin ..................... | H04L 63/1441 |
| 2020/0348986 A1* | 11/2020 | Venkatesh ................ | G06F 8/36 |
| 2021/0096916 A1* | 4/2021 | Huus ......................... | G06F 9/54 |
| 2021/0136095 A1* | 5/2021 | Dinh ........................ | G06N 5/01 |

OTHER PUBLICATIONS

Wijesekare, "Designing API Management Solutions with WSO2 API Manager: Everything you need to know", discloses API manager handling API requests, Jun. 14, 2019, pp. 1-17. (Year: 2019).*
Traefik Labs, "API gateway", discloses method of routing API requests (pp. 1-17). (Year: 2020).*

* cited by examiner

*Primary Examiner* — Andy Ho
*Assistant Examiner* — Phuong N Hoang

(57) ABSTRACT

A real-time dynamic API traffic shaping and infrastructure resource protection in a multiclient network environment is provided. A traffic rules engine (TRE) applies traffic shaping only to customers that are utilizing "more than their fair share" of the currently available bandwidth without allowing them to negatively impact the user experience of other users. The present invention takes current API traffic into consideration, allowing one or a few high volume users to utilize most of all available bandwidth as long as other users do not need that bandwidth. This includes dynamically measuring and adjusting which users had traffic shaping applied to them based on the overall traffic during any given second. The solution of the present invention avoids any slowdown of customer API requests unless the maximum allowable TPS limit is near to being reached.

14 Claims, 4 Drawing Sheets

METHOD AND APPARATUS FOR REAL-TIME DYNAMIC APPLICATION PROGRAMMING INTERFACE (API) TRAFFIC SHAPING AND INFRASTRUCTURE RESOURCE PROTECTION IN A MULTICLIENT NETWORK ENVIRONMENT

FIELD OF THE INVENTION

The invention disclosed herein relates generally to networked systems and use of Application Programming Interfaces (APIs), and more particularly to real-time dynamic API traffic shaping and infrastructure resource protection in a multiclient network environment.

BACKGROUND OF THE INVENTION

APIs are well known and used extensively to allow seamless interfaces between software applications running on different devices within a networked system. One such use of APIs can be found in services provided by Pitney Bowes Inc., the assignee of the present invention, for generating shipping labels. The Pitney Bowes Complete Shipping API provides an API platform that provides shipping services to thousands of end users. At its most basic, the API platform provides a method for Pitney Bowes' partners to make API requests for shipping related information, such as shipping label images, rate quotes, address validation services, etc. The platform itself supports multiple carriers, but the bulk of traffic is centered around providing services for United States Postal Service shipping. Like any other API service of this type, there is a finite limit on the number of API requests that can be responded to during any given second. While modern cloud computing infrastructure, such as, for example, Amazon Web Services (AWS), can conceptually scale up capacity on demand, the specific cryptographic requirements necessary to comply with USPS requirements to generate postal indicia (which is effectively US currency) makes infinite scaling more challenging, especially on a minute by minute basis.

The system limitations for APIs can be defined in two ways: (i) Transactions Per Second (TPS) Limitation, and (ii) API Transaction Spacing. With respect to the TPS Limitation, APIs are limited by a total number of transaction requests per second that the API operation is capable of handling, regardless of whether those requests come in simultaneously or are more evenly spread throughout the one second period. With respect to the API Transaction Spacing, this relates to whether or not the API needs to be protected from simultaneous or near simultaneous transaction requests, and if so, how many milliseconds do the calls need to be spaced out. For example, a given API might be able to easily handle 100 evenly spaced transactions during a 1 second period, but will experience problems if it received 10 simultaneous transactions, even though that is only 10% of the maximum TPS the system can handle.

With respect to TPS Limitations, in many instances, the initiator of most API requests comes from a partner (user of the API) rather than from applications controlled by the provider of the API. For example, suppose Company A has partnered with Company B to allow Company A's customers, using Company A's web based application, to make calls to Company B using Company B's API to make a request for some service from Company B. Such a service could be, for example, paying for, generating, and printing a shipping label for a package to be sent through the mail.

Each time a Company A customer clicks the button to print a shipping label, Company A's website calls on Company B to generate the label image and pay for the shipping cost. If one of Company A's customers attempts to generate 100,000 labels in a large batch, Company B does not control whether Company A sends those label requests at a rate of 10 per second or 10,000 per second. Accepting too many requests per second runs the risk of slowing down the response time of the Company B API, or even crashing internal systems, both of which could affect the user experience of Company A's customers, as well as all other Company B's API customers.

To help with such issues, technology has been developed; including, for example, gateway technology that can automatically scale and perform load balancing based on the current volume of API traffic passing through the gateway. The issue with respect to such gateway technology is that each instance of the gateway can only track the number of requests it is currently handling. Each gateway has no way of aggregating and counting all the requests coming through all of the currently deployed instances of the gateway. For example, suppose there are ten instances of the gateway function currently serving as the gateway for an API, and customers are calling the API at a rate of 10,000 times every second. The gateway load balancers separate out the requests so that each gateway instance is transmitting 1,000 transactions per second to the underlying API. In this example, because each instance is independent, there is no way to accurately determine that 10,000 requests are coming through to the underlying API.

Other types of technology to help to control the traffic of such requests, often referred to as traffic shaping, have also been developed. Such traffic shaping solutions typically operate to limit the number of transactions per second that would be allowed through to the underlying system architecture in a way that has as little impact on users as possible. In cases where one or more users were sending unexpectedly high traffic volume the goal would be to attempt to slow down responses rather than sending back error responses, as interviews with customers indicated that delayed responses were preferred over error responses. Such known solutions typically center around some variation of the "Leaky Bucket" or its variant "Token Bucket" solutions. The analogy used to describe to the Leaky Bucket traffic shaping solution is an actual physical bucket with a hole drilled in the bottom. Droplets of water represent the API requests being sent to the system, and each user sends water droplets into the bucket at whatever rate they wish. The bucket represents a queue, and the hole in the bottom of the bucket represents the rate at which requests will be allowed through. The Token Bucket solution is simply a variant similar to the Toyota "Kanban" system where tokens are generated at a set rate and each request needs to use one of the generated tokens to be allowed through, but this variant doesn't really change the bucket analogy. The primary issue with these solutions is that individual users could misbehave by sending more requests than the system could handle. Because the Leaky Bucket and Token Bucket algorithms operate on a First in First Out (FIFO) basis, the "bad actors," unintentional or otherwise, can use up most or all of the available bandwidth for a given API and thereby negatively impact the customer experience of all other users.

Thus, as noted above, there are areas that present challenges to existing traffic shaping solutions. Existing traffic shaping solutions do not have any intrinsic control of how many requests individual users can send during any given time period. Using the bucket analogy, any given user can fill the bucket at such a high rate that all other users can't get any water into the bucket at all (imagine a bucket with a small hole under a raging water fall). Some solutions do add in the ability to put arbitrary limits on the TPS of individual users, but these limits did not take current conditions into account. For example, an arbitrary limit might be placed on a given user to keep them from sending more than 100 Transactions Per Second. However, during low volume periods (such as the middle of the night) there is no reason to limit a customer to 100 TPS if the API is capable of handling 1,000 TPS overall. But the same cannot be said for a peak volume period where the total volume of traffic might be dose to or exceeding 1,000 TPS due to many different clients utilizing the API simultaneously.

Further, existing traffic shaping solutions do not dynamically account for current conditions. Existing solutions always apply traffic shaping (meaning that the transactions are slowed down) even when customers are behaving well, and even if there is almost no traffic on the API. For example, if the "hole in the bucket" is configured to allow 100 TPS, it will allow one API request to be sent to the API service every 10 milliseconds. This means that if 5 API calls come in nearly simultaneously, the 5th API request will have 50 milliseconds added onto its response time even though only 5% the API bandwidth is being used. Additionally, existing solutions are not able to separate TPS protection from concurrent transaction protection. Transaction Spacing and maximum TPS limits are tied together and cannot be easily separated. While some infrastructure needs to be protected from high numbers of transactions, and some need protection against simultaneous transactions, different applications have different tolerance levels for each scenario. If the stated goal is to have the least impact as possible on the customer experience, automatically combining both types of protection into the same solution means that the traffic shaping solution will have a greater negative impact on customers than is absolutely necessary.

Thus, there exists a need for a traffic shaping solution that is able to calculate the total number of API transactions coming through the pipeline regardless of how many instances of the solution are deployed, and would protect internal API infrastructure from being overwhelmed by high volumes of traffic, but doing so in a way that preserved the highest level of customer experience.

SUMMARY OF THE INVENTION

The present invention alleviates the above problems by providing a traffic rules engine (TRE) that applies traffic shaping only to customers that are utilizing "more than their fair share" of the currently available bandwidth without allowing them to negatively impact the user experience of other users. What is considered a fair share would be adjustable based on increased capacity of APIs as time goes on and systems are optimized and enhanced. The solution of the present invention takes current API traffic into consideration, allowing one or a few high volume users to utilize most of all available bandwidth as long as other users do not need that bandwidth. This includes dynamically measuring and adjusting which users had traffic shaping applied to them based on the overall traffic during any given second. The solution of the present invention avoids any slowdown of customer API requests unless the maximum allowable TPS limit is near to being reached. Furthermore, the solution of the present invention provides the ability to customize the levels of TPS and concurrent transaction protection on a per API basis.

The TRE of the present invention significantly improves the performance of the multiclient network environment in which it is installed by providing a solution that addresses all of the major issues with the existing traffic shaping solutions based on the Leaky Bucket algorithms in the following ways:

It segregates the transactions of bad actors from those of other users so that bad actors cannot negatively impact well behaved users.

Bad actors are defined on a second by second basis, preventing any need for the creation of a predefined list of problem users.

Traffic shaping is not applied at all until bandwidth availability is an issue during the current second.

Traffic spacing can be applied separately from transactions per second limiting, allowing for greater customization of traffic shaping for specific applications.

Traffic spacing can be applied only for specific criteria, further increasing customization of how APIs are protected.

Machine learning or other analytics can be applied to the system to provide real time optimizations as needed.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, by way of example serve to explain the invention in more detail. As shown throughout the drawings, like reference numerals designate like or corresponding parts.

DETAILED DESCRIPTION OF THE PRESENT INVENTION

Figure 1:
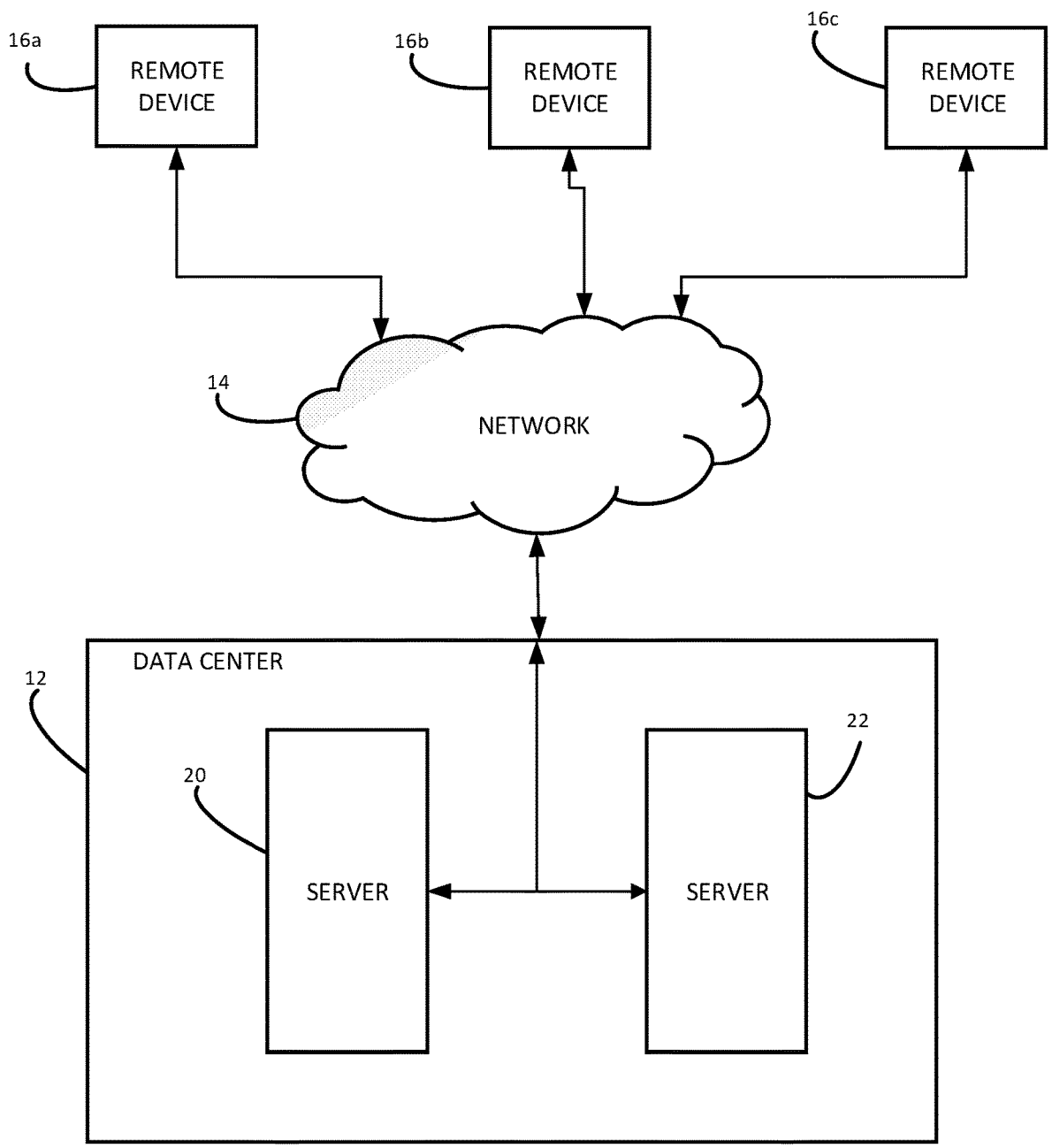
FIG. 1 illustrates in block diagram form a system architecture overview of a multiclient networked environment in which the TRE according to an embodiment of the present invention is utilized.

In describing the present invention, reference is made to the drawings, wherein there is seen in FIG. 1 in block diagram form a system architecture overview of a multiclient networked environment in which the TRE according to an embodiment of the present invention is utilized. The networked environment includes a data center 12 operated by a service provider that provides services to clients through API requests made by the clients. The data center 12 is coupled to a network 14, such as, for example, the internet. Clients of the service provider communicate with the data center 12 using one or more remote devices 16a, 16b, 16c coupled to the network 14. Remote devices 16a, 16b, 16c can be any type of processing device, such as for example a personal computer, laptop, tablet, etc. While only three remote devices 16a, 16b and 16c are illustrated in FIG. 1, it should be understood that there can be any number of such devices that can access the data center 12.

Each of the remote devices 16a, 16b or 16c are used by a respective client to request a service from the data center 12 via the network 14 via an API request. The data center includes a one or more servers 20, 22, that are utilized to process the API request and return a result, to the requesting client device 16a, 16b, 16c for use by the client. Each of the servers 20, 22 may be a mainframe or the like that is specially constructed for the required purposes, or it may comprise a general purpose computer selectively activated or reconfigured by a computer program stored therein to perform the required functions. Such a computer program may alternatively be stored in a computer readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, which are executable by a processing device within each server 20, 22. One of ordinary skill in the art would be familiar with the general components of a server system upon which the method of the present invention may be performed. While FIG. 1 illustrates two servers, it should be understood that any number of servers can be provided.

Figure 2:
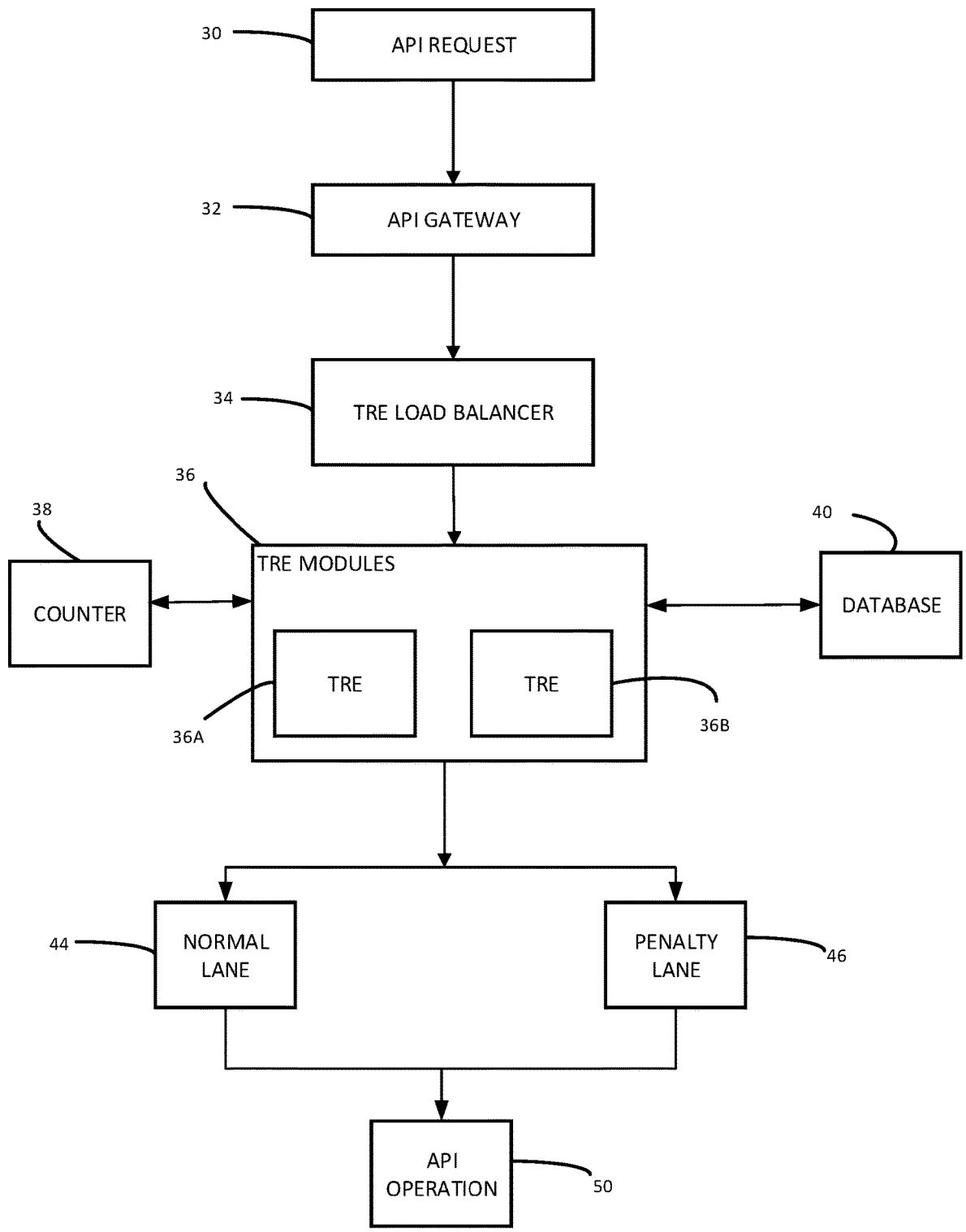
FIG. 2 illustrates in block diagram form a functional overview of how the TRE according to an embodiment of the present invention integrates within an API workflow.

Referring now to FIG. 2, there is illustrated in block diagram form a functional overview of how the TRE according to an embodiment of the present invention integrates within an API workflow. Each of the modules/functions described in FIG. 2 can be implemented as hardware, software or a combination of the two operating in one or more of the servers 20, 22 illustrated in FIG. 1, API requests 30 for the API operations 50 are received from a remote device 16a, 16b, 16c via the network 14 by an API gateway device 32, such as, for example, a gateway provided by Apigee. The API gateway device 32 manages all incoming API requests 30 to the API operations 50. The API Operations 50 could be for example, services for shipping related information, such as generating and providing shipping label images, rate quotes, address validation services, etc. The API gateway device 32 sends the API request 30 to a TRE Load Balancer device 34, which then routes them to the currently deployed instances of the TRE module 36. As illustrated in FIG. 2, there are two concurrently deployed instances of the TRE modules 36a and 36b, but any number of instances may be provided.

To maintain a counter of the total number of requests routed to all of the instances of TRE modules 36, one or more counters 38 is used, such as, for example, Redis' technology to manage and iterate counters, but the logic for how to react to those counters is maintained in the TRE module 36. The counters 38 can be adjusted up or down at times measured in nanoseconds. A counter 38 is created for each operation to track the total number of transactions that have occurred during a 1 second period, and additional counters are created on the fly for each client that makes an API request 30. For example, if client ABC and client DEF both make fifty API requests during a 1 second period, the counters 38 will track that one-hundred transactions have occurred during that second, as well as having a counter for each of the clients that shows a value of fifty each. The nature of the counter 38 is that it can track a single set of counters regardless of the number of instances of the TRE modules 36 that are deployed. This allows for load balancing of the TRE service without sacrificing the ability to track the total number of requests going to the underlying API Operation 50.

A database 40 is utilized to store the limit values (as described below) in case a new TRE module 36 instance needs to be deployed or an existing instance needs to be reset. The TRE module 36 decides if traffic shaping needs to be applied to an incoming API request, and if the incoming API request will be slowed down, refused, or allowed to pass through to the underlying API operation 50 (i.e., is processed via the Normal Lane 44 or Penalty Lane 46 as described below). The API operation 50 will receive the request from either the Normal Lane 44 or Penalty Lane 46, and perform the requested service. As noted above, such API services could include services for shipping packages, such as generating and providing shipping label images, rate quotes, address validation services, etc., but could be any underlying API service endpoint.

The TRE module 36 punishes bad actors by limiting their allowed number of transactions per second, but only so long as they misbehave. The limitation takes the form of slowing down API responses for that user, or in extreme cases some of the API requests 30 will be immediately refused. This prevents a single user from using up all of the available bandwidth, but the system logic allows the TRE module 36 to give high volume users more leeway to send more traffic through the system if lower volume users are not taking up the bandwidth themselves. The initial checks on how to handle traffic shaping are aimed at protecting the API Operations 50 based on the limiting the maximum TPS sent to an API Operation 50. The TRE module 36 stores predefined limits that can be easily be tuned and adjusted via an API call or automated logic.

Figure 3:
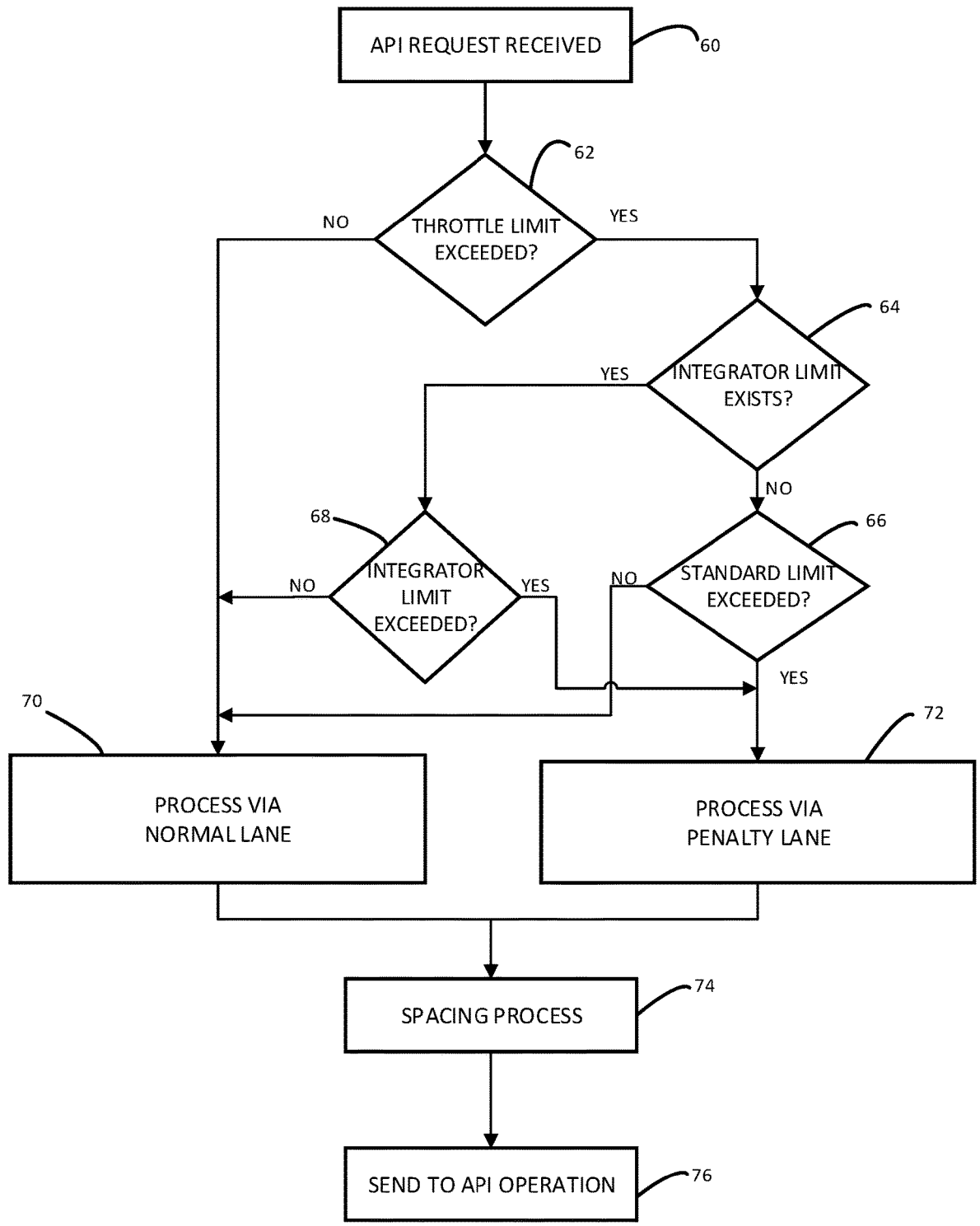
FIG. 3 illustrates in flowchart form the operation of the TRE according to an embodiment of the present invention for the Transaction Per Second protection layer.

Referring now to FIG. 3, there is illustrated in flowchart form the operation of the TRE 36 according to an embodiment of the present invention for the Transaction Per Second protection layer. The processing described herein is performed by each instance of a TRE module 36 individually from the other instances. The process starts in step 60 where an API request 30 is received by one of the TRE modules 36 instances from the TRE Load Balancer device 34. In step 62, the TRE module 36 first looks to see if the total number of transactions that have occurred during the current second, provided by the counter 38, exceeds a set Throttle Limit. The Throttle Limit is set based on an Operation Limit for a specific API service 50. The Operation Limit is the overall maximum transactions per second (Max TPS) that are allowed for the specific API service 50. This value is determined based on the service being provided by the API service 50, and can vary for different API services. The Throttle Limit must always be less than the Operation Limit, and the Throttle Limit is preferably set anywhere from 50-75% of the Operation Limit depending on risk tolerance. The higher it is set the greater the percentage of bandwidth that can be used up before the TRE module 36 begins throttling any customer transactions (API requests 30). The purpose behind first checking if the Throttle Limit has been exceeded is to prevent the throttling of any traffic (API requests 30) if there is sufficient bandwidth available (i.e., a low amount of API requests 30 coming into the system). This can be considered the "tachometer" for the TRE module 36. Setting the Throttle Limit value defines the point at which the available bandwidth of an operation is considered to be nearing a point where TPS is a concern. The purpose of determining if the Throttle Limit has been exceeded is to determine if the Integrator Limit or Standard Limits (as described below) need to be checked against the current TPS flowing through the TRE module 36.

Figure 4:
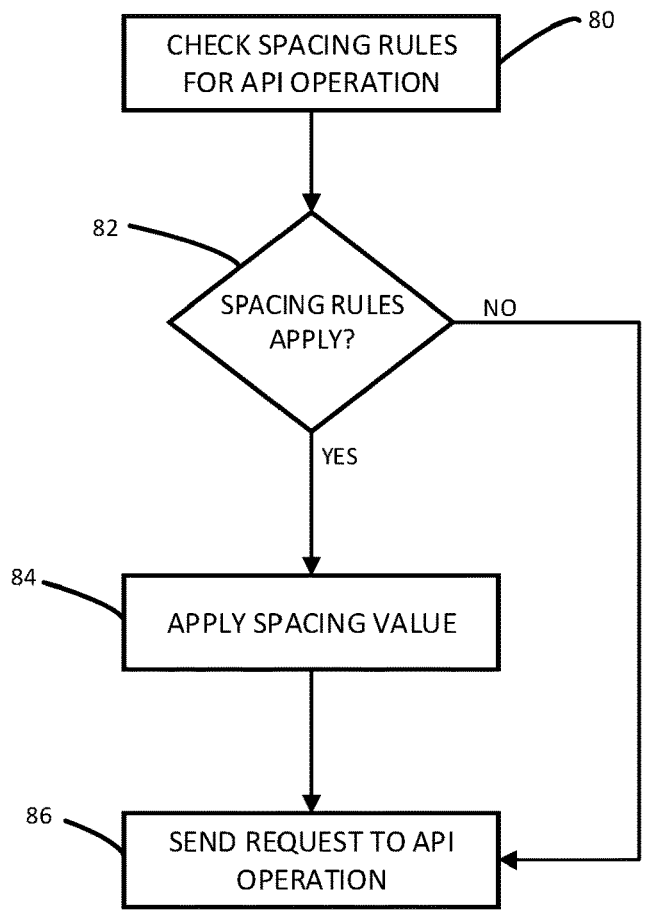
FIG. 4 illustrates in flowchart form the operation of the TRE according to an embodiment of the present invention for providing spacing between API requests as an optional concurrent transaction protection layer.

If in step 62 it is determined that the Throttle Limit has not been reached, then in step 70 the API request 30 is processed via the Normal Lane 44, meaning that it is not queued and not slowed down at all based on customer behavior (however, spacing could still be applied as described with respect to FIG. 4, but spacing is not based on customer behavior). If in step 62 it is determined that the Throttle Limit has been exceeded, then in step 64 the TRE module 36 checks to see if the customer making the API request 30 has an Integrator Limit that applies to that customer. An Integrator Limit (or Customer Limit) is an optional specific TPS limit allowed for that customer for a specific API service 50 (e.g. label creation, address validation, etc.) and can be stored, for example, in database 40. These limits can be set by contractual arrangements, such that a customer that pays more for a service can have a higher Integrator Limit than other customers. If the customer does not have an Integrator Limit set, that customer will be constrained by the Standard Limit. The Standard Limit is the Max TPS allowed for any customer that does not have a specific Integrator Limit, and can be set based on the preference of the TRE module 36 operator. Thus, each Integrator Limit is a customer specific value. The Integrator Limit could be set lower than the Standard Limit, but generally the Integrator Limit is used to provide a traffic shaping exception to extremely high volume users to give them more leeway or to fulfill a contractual agreement for a guaranteed number of transactions per second. If the customer has an Integrator Limit set then that will supersede the Standard Limit. During low traffic times, neither the Integrator Limit nor the Standard Limit will have any effect on the processing of an API request 30, because the TRE module 36 only cares about this value if the Throttle Limit has been exceeded (yes response in step 62).

If in step 64 it is determined that an Integrator Limit exists, then in step 68 it is determined if the Integrator Limit has been exceeded. If in step 68 it is determined that the Integrator Limit has not been exceeded, then in step 70 the API request 30 is processed via the Normal Lane 44, meaning that it is not queued and not slowed down at all based on customer behavior (however, spacing could still be applied in as described with respect to FIG. 4, but spacing is not based on customer behavior).

If in step 68 it is determined than the Integrator Limit has been exceeded, then in step 72 the API request is processed via the Penalty Lane 46. The Penalty Lane 46 for an API operation follows the standard rules for the Leaky Bucket algorithm, but the difference is that only customers that are exceeding their fair share of bandwidth will ever have their transactions processed through in the Penalty Lane 46. Thus, the API requests 30 that are processed via the Penalty Lane 46 are placed in a memory queue (the bucket) and released at some predetermined rate as set by the system (the hole in the bottom of the bucket) in a First In First Out (FIFO) manner. Although two or more customers might simultaneously "misbehave" by sending exceedingly high numbers of transactions in a short period, which would allow them to negatively affect the user experience of one another because their API requests would be processed through the Penalty Lane 46, this is considered acceptable because both customers have exceeded the suggested number of transactions per second allowable for the API. The Penalty Lane 46 can be configured to have its own spacing or to allow transactions through at any rate, but limits the total number allowed through in a second.

Once the API request 30 has been processed in step 70 through the Normal Lane 44 or in step 72 through the Penalty Lane 46, then optionally in step 74 the API request 30 is sent to an optional spacing process (described below with respect to FIG. 4) to provide an additional layer of concurrent transaction protection. The optional spacing process is preferably performed after the initial TPS protection describe above so that spacing can occur after any customers that are sending too many requests have had some of their requests weeded out. Once the spacing process is complete (or if the spacing process is not utilized), then in step 76 the API request is sent to the API operation 50 to be acted upon. It should be understood that only if the Throttle Limit and the Standard Limit (or the optional Integrator Limit) are exceeded will the API request 30 be processed via the Penalty Lane 46. This significantly improves the performance of the multiclient network environment in which the TRE module 36 of the present invention is installed as compared to the prior art by providing a solution that segregates the transactions of bad actors from those of other users so that bad actors cannot negatively impact well behaved users; defining bad actors on a second by second basis, preventing any need for engineers or product managers to create a predefined list of problem users; allowing machine learning or other analytics to be applied to the system to provide real time optimizations as needed; and not applying traffic shaping at all until bandwidth availability is an issue during the current second. This significantly improves the performance of the system over the current traffic shaping solutions.

Referring now to FIG. 4, there is described the provision of spacing between API requests 30 as an optional concurrent transaction protection layer (step 74 of FIG. 3). This spacing process is preferably placed after the initial TPS protection so that spacing can occur after any customers that are sending too many requests have had some of their requests weeded out. When spacing is applied for reasons other than customer behavior it does mean that individual users can affect the user experience of others, the impact of bad actors is minimized because any overuse of the system has already been addressed by slowing or refusing bad actors' transactions before spacing is applied. This layer of the TRE 36 is designed to allow customization of how Traffic Spacing is applied. Rather than simply apply a blanket level of spacing to the API requests 30 for a protected API, this layer can apply protection based on API request characteristics. This is because some API operations 50 may need to have all API requests 30 spaced out evenly, while others may only need spacing if certain criteria are met. For example, a reporting API may easily handle a thousand simultaneous requests that each specify a single transaction, but could experience system issues handling 100 simultaneous transactions if each request specifies a large date range and requires a response that includes thousands of individual transactions.

After an API request 30 has been processed via the penalty lane (step 72 of FIG. 3) or the normal lane (step 70 of FIG. 3), then in step 80 the API request 30 is checked against a set of spacing rules that are configured specific to the API operation 50 to which the API request 30 is directed. Such spacing rules could be stored, for example, in the database 40. Each API operation 50 can have its own set of rules as well as its own set of spacers. For example, there might be three rules and two spacers for a given API operation 50. Two of the rules, each of which might look for a specific field in the JSON body, header, or query parameter, might apply a first spacer value to an API request 30, while the third rule would apply a second spacer value to an API request 30. The first spacer value might be configured to apply 10 milliseconds between each API request 30, while the second spacer value would apply 100 milliseconds of spacing. Alternatively, there could simply be a single rule and a single spacer configured so that every API request 30 for the specific API operation 50 has a spacer value applied. In step 82, it is determined if one or more spacing rules apply to the API request 30 for the specific API operation 50. If there are no spacing rules then in step 86 the API request 30 is sent to the API operation 50 without any spacing being applied. If in step 82 it is determined that one or more spacing rules do apply to the API request for the specific API operation 50, then in step 84 the spacing value is applied to the API request 30 (by applying a delay of the time specified in the applicable rule before sending the API request 30 to the API operation), and then in step 86 the API request 30 is sent to the API operation 50.

In accordance with embodiments of the present invention, the TRE module 36 supports the ability to adjust the limits, penalty lane limitations, and "spacers" based on real time analysis rules or machine learning to support the alteration of the system configuration based on the existing load on specific API operations. For example, the Penalty Lane and Throttle Limit could be automatically adjusted upwards during known low traffic periods to allow users to time their high speed batches late at night when other users do not need the system bandwidth. The analogy would be adjusting the speed limit of a freeway depending on the number of cars on the road (which is ok in this case because there is no danger of API packets crashing). For example, suppose the following settings are currently in place: 500 TPS Operational Limit; 250 TPS Throttle Limit; 100 TPS Penalty Lane Throughput limit; 100 TPS Standard Limit. With these settings in place, imagine that an API operation 50 has only a single developer calling it at a rate of 260 TPS for a five minute period. After the first second or two their total TPS would be limited to 100 because their transactions would be routed to the Penalty Lane 46. However, an intelligent monitoring system could see this situation and see that the API operation 50 itself is capable of handling 500 TPS but only 100 TPS is actually making it to the API operation 50, even though the single user is sending 260 TPS. The TRE 36 could temporarily adjust the penalty lane TPS limit to something like 280 TPS, thereby allowing all of the user's traffic through without any risk of exceeding the 500 TPS overall limit.

The present invention significantly improves the performance of the multiclient network environment in which it is installed by providing a solution that addresses all of the major issues with the existing traffic shaping solutions based on the Leaky Bucket algorithms in the following ways:

It segregates the transactions of bad actors from those of other users so that bad actors cannot negatively impact well behaved users.

Bad actors are defined on a second by second basis, preventing any need for the creation of a predefined list of problem users.

Traffic shaping is not applied at all until bandwidth availability is an issue during the current second.

Traffic spacing can be applied separately from transactions per second limiting, allowing for greater customization of traffic shaping for specific applications.

Traffic spacing can be applied only for specific criteria, further increasing customization of how APIs are protected.

Machine learning or other analytics can be applied to the system to provide real time optimizations as needed.

While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for processing an API request for an API operation made by a customer using a remote device comprising:
    receiving at a processing module the API request via a network from the remote device;
    determining, by the processing module, if a threshold number of transactions per second for the API operation has been exceeded;
    if the threshold number of transactions per second has not been exceeded for the API operation, sending by the processing module the API request to the API operation via a first processing path that does not have a limit for a number of transactions per second that will be sent to the API operation;
    if the threshold number of transactions per second has been exceeded for the API operation, determining, by the processing module, if the customer has a customer limit value for a number of API requests per second;
    if the customer does have the customer limit value for the number of API requests per second, determining, by the processing module, if the customer limit value for the customer has been exceeded;
    if the customer limit value for the number of API requests per second for the customer has not been exceeded, sending by the processing module the API request to the API operation via the first processing path;
    if the customer limit value for the customer for the number of API requests per second has been exceeded, sending by the processing module the API request to the API operation via a second processing path that is different than the first processing path, the second processing path having a predefined limit for the number of transactions per second that will be sent to the API operation;
    if the customer does not have the customer limit value for the number of API requests per second, determining, by the processing module, if a standard limit value for the number of API requests per second has been exceeded;
    if the standard limit value for the number of API requests per second has not been exceeded, sending by the processing module the API request to the API operation via the first processing path; and
    if the standard limit value for the number of API requests per second has been exceeded, sending by the processing module the API request to the API operation via the second processing path.

2. The method of claim 1, wherein the threshold number of transactions per second is based on an operation limit of transactions per second for the API operation.

3. The method of claim 2, wherein the threshold number of transactions per second is 50-75% of the operational limit.

4. The method of claim 1, wherein the customer limit value is higher than the standard limit value.

5. The method of claim 1, wherein the customer limit value is lower than the standard limit value.

6. The method of claim 1, wherein the second processing path includes a memory queue, and the API request is released from the memory queue at a predetermined rate.

7. The method of claim 1, further comprising:
   determining, by the processing module, if a spacing rule applies for the API operation for the API request;
   if the spacing rule does apply, applying a spacing value to the API request; and sending the API request to the API operation with the applied spacing value.

8. An API request processing system for processing an API request for an API operation made by a customer using a remote device, the system comprising:
   a database associated with a request processing system, the database storing limit values corresponding to operation of the request processing system; and a processing module comprising processing circuitry configured to:
   determine if a threshold number of transactions per second for the API operation, stored in the database, has been exceeded;
   if the threshold number of transactions per second has not been exceeded for the API operation, send the API request to the API operation via a first processing path that does not have a limit for a number of transactions per second that will be sent to the API operation;
   if the threshold number of transactions per second has been exceeded for the API operation, determine if the customer has a customer limit value, stored in the database, for a number of API requests per second;
   if the customer does have the customer limit value for the number of API requests per second, determine if the customer limit value for the customer has been exceeded;
   if the customer limit value for the number of API requests per second for the customer has not been exceeded, send the API request to the API operation via the first processing path;
   if the customer limit value for the customer for the number of API requests per second has been exceeded, send the API request to the API operation via a second processing path that is different than the first processing path, the second processing path having a predefined limit for the number of transactions per second that will be sent to the API operation;
   if the customer does not have the customer limit value for the number of API requests per second, determine if a standard limit value, stored in the database, for the number of API requests per second has been exceeded;
   if the standard limit value for the number of API requests per second has not been exceeded, send the API request to the API operation via the first processing path; and
   if the standard limit value for h number of API requests per second has been exceeded, send the API request to the API operation via the second processing path.

9. The system of claim 8, wherein the threshold number of transactions per second is based on an operation limit of transactions per second for the API operation.

10. The system of claim 9, wherein the threshold number of transactions per second is 50-75% of the operational limit.

11. The system of claim 8, wherein the customer limit value is higher than the standard limit value.

12. The system of claim 8, wherein the customer limit value is lower than the standard limit value.

13. The system of claim 8, wherein the processing circuitry if further configured to:
   determine if a spacing rule applies for the API operation for the API request;
   if the spacing rule does apply, apply a spacing value to the API request; and send the API request to the API operation with the applied spacing value.

14. The system of claim 8, wherein the second processing path includes a memory queue, and the API request is released from the memory queue at a predetermined rate.

* * * * *